United States Patent Office 2,870,885
Patented Jan. 27, 1959

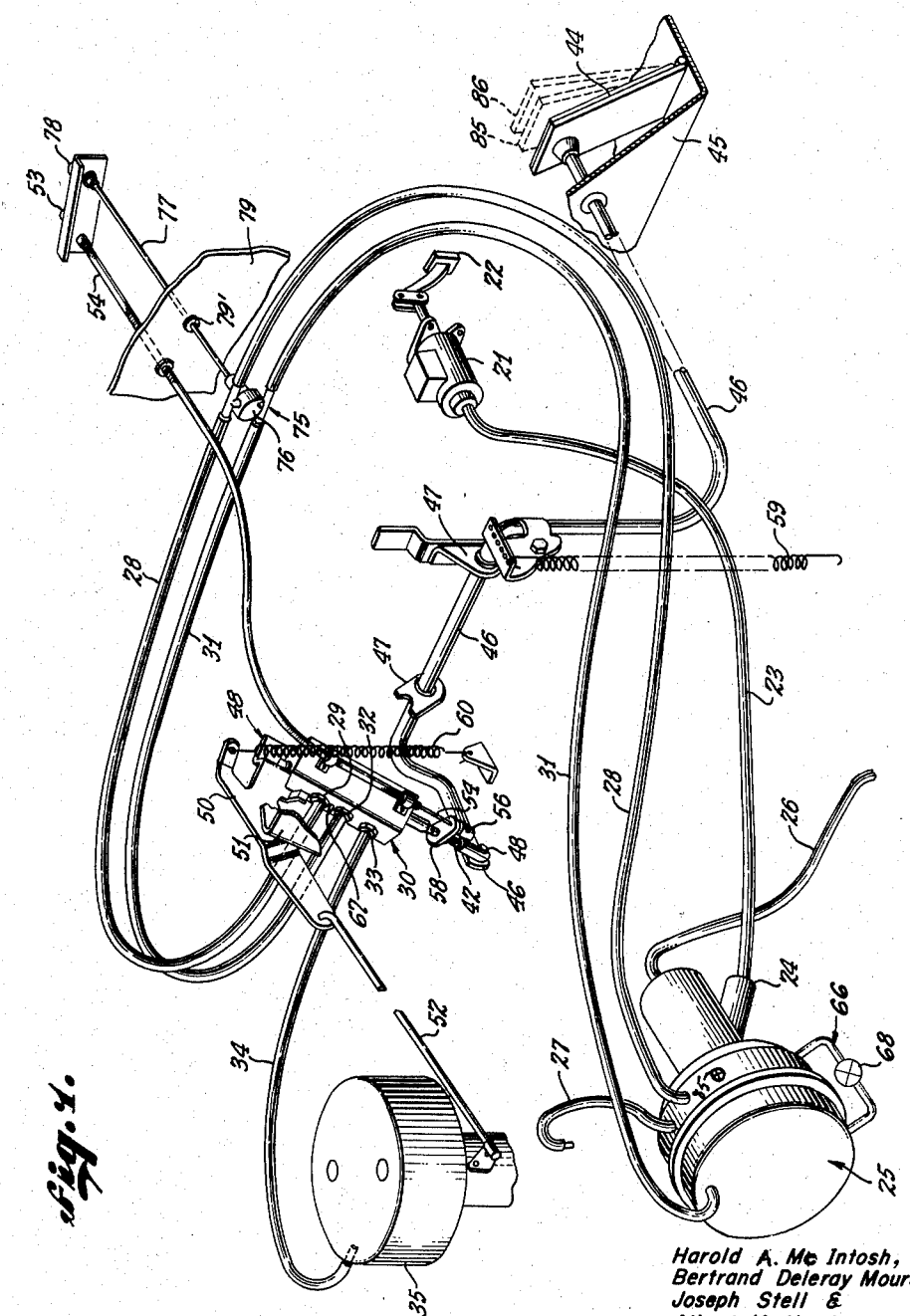

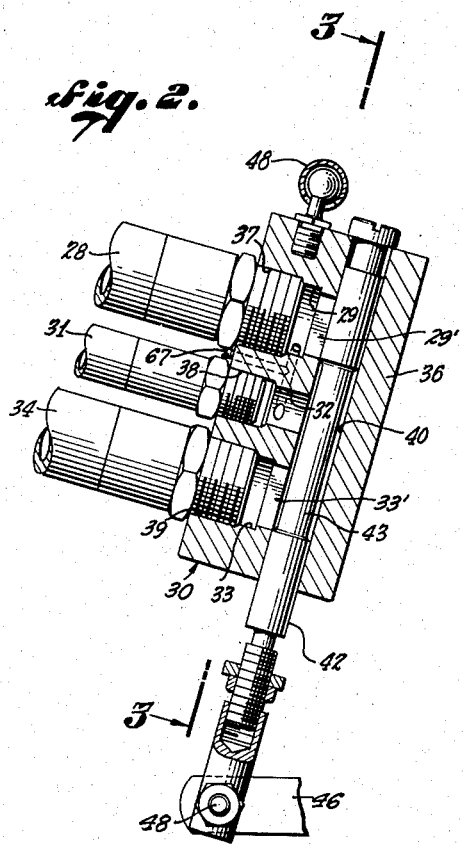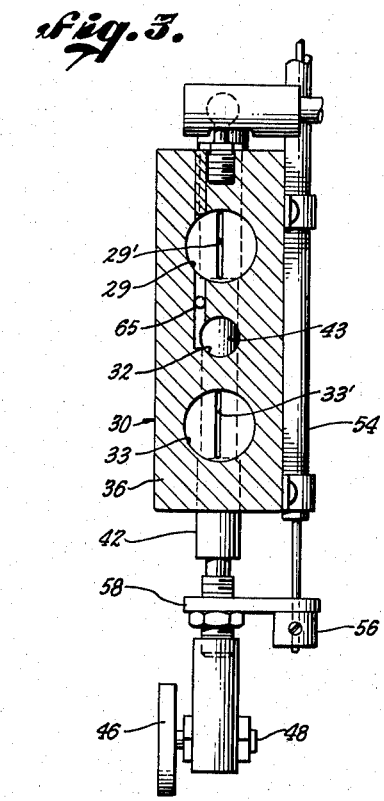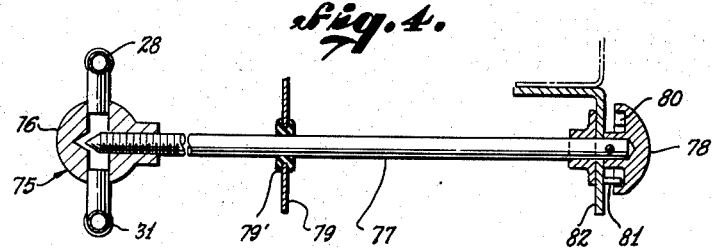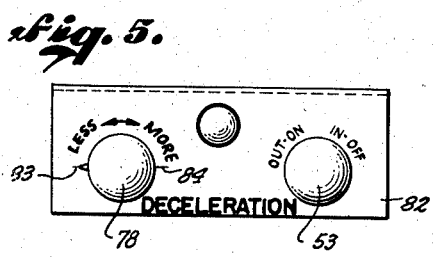

2,870,885

DECELERATOR BRAKE FOR MOTOR VEHICLES

Harold A. McIntosh, Los Angeles, Bertrand Deleray Mouron, South Laguna, and Joseph Stell and Albert M. Herzig, Los Angeles, Calif.

Application September 19, 1955, Serial No. 534,942

5 Claims. (Cl. 192—3)

This invention relates to automatic decelerating mechanism associated with and operated by the accelerator pedal, or the like, and the brake mechanism of an automobile or other motor vehicle.

It is intended by the present invention to provide improvements over prior art devices heretofore intended to accomplish generally similar purposes and more specifically it is an object of the invention to provide means for softening the heretofore encountered undesirable slamming action of the brakes of the motor vehicle upon their automatic decelerating application. It is among the objects of this invention, therefore, to provide relatively mild deceleration means of a character heretofore deemed "underpowered."

A purpose and object of the incident of the invention is to provide an automatic decelerator action for a motor vehicle after the removal of the operator's foot from the propelling fuel range of the accelerator control pedal and before his actuation of the foot brake pedal.

In most cases a slowing up of the vehicle is all that is required to lessen or avoid the danger of impact or collision. In operating a vehicle within the traffic congestion and at high speeds prevalent on todays expressways, highways, and roads, the operator of a motor vehicle is repeatedly and rapidly subjected to three basic decisions; to slow up, to stop, or to go forward. Fractions of seconds saved in the response of the vehicle while and after the operators decision is reached and while he is executing that decision, can be the measure between injury, death, or life.

Automatic decelerator action creates a uniform operator pattern causing smooth control of the slow-up of speed and puts the vehicle in a caution phase of control while the operator decides whether to further slow-up or stop, by assisting with the use of his foot brake pedal, or again to go forward or increase his speed. No driving habit is disturbed, no uncommon physical effort is required, yet the vehicle is caused to automatically enter a caution phase of smooth deceleration, snubbing control, and slow-up, the instant the operator is aware of necessity of decision because of apparent or real hazard, or a desire to stop.

As the operator instinctively retracts his foot from the propelling fuel throttle range, the automatic decelerator, spring loaded, is actuated. It causes a uniformly smooth snubbing and slow-up control of the brake mechanism, thereby reducing the velocity of the vehicle. This automation takes place before the operator is able to manually depress his foot brake pedal. The vehicle continues, but under uniform smooth snubbing control which reduces velocity until decision is reached, either to manually further "boost" the deceleration rate and/or achieve a complete stop with the additional aid of the foot brake pedal, if this is desired.

If the decision, while the decelerator action is taking place, is to further slow-up or stop, a distinct safety advantage is gained because the decelerator action has already seated the brake bands around the brake drums preparing them for instantaneous reflection of the additional manual actuation of the "boost" resulting from the physical act of the depression of the foot brake pedal.

If the decision is reached to leave the caution phase of slow-up and to go forward again, then the automatic decelerator will cause an instant release of its snubbing control over the brake system and the instant withdrawal of the brake bands or clenching means away from their position around the brake drums or contacting frictional or energy absorbing surfaces.

A further purpose and object of the instant invention results from the aforesaid automatic decelerator action in that it achieves full time control over the vehicle to the extent that the vehicle while being propelled is never in a state of wild "free wheeling." It either is being propelled forward or being stopped at the election of the operator unless deliberately held in a neutral position.

A further purpose and object of the instant invention is to minimize panic stops and too rapid deceleration such as accompanies the fast stops of a character tending to throw passengers forwardly in their seats, requiring them to brace themselves with their arms or legs or other means. Such stops are also characterized by the throwing of infants and small children from their seats or against windshields or the dash panel of the vehicle when they are taken by surprise by such stops or manual brake-achievable extremes of deceleration.

Power brakes now available are characterized by great sensitivity in that they are powered for capacity vehicle loads at extreme speeds. On ice, slippery roads, or at low speeds, they are a hazard for then only mild braking action is desirable or permissible. A too rapid deceleration or a fast stop will cause skidding or slamming stops and/or loss of full operator control of the vehicle.

The instant invention is predicated, in addition to the other reasons heretofore referred to, on the fact the foot brake is unnecessary for providing the desired mild deceleration accompanying the average desired slowdown which is readily obtained with comfort and safety to the passengers. By this invention such deceleration is achieved by the decelerator or foot throttle control.

When a power unit or booster is capable of bringing a vehicle to a skidding stop on dry cement or like roads, upon the application thereof, it is over powered and not suited to the uniform gentle and smooth deceleration contemplated by this invention unless modified as disclosed herein.

Applicant has found, moreover, that by using a power or booster unit which is considered "underpowered" by conventional standards, a desired "deceleration" as herein referred to is attained. Thus, a small Midland type booster unit rated at approximately 250 pounds of pressure, as used on current Ford models, is suitable for a more rapid deceleration than is desired by the instant invention even when directly used as an accelerator-actuated power unit without serving its customary "booster" purpose, i. e., foot-brake-pedal-actuated "power brake." A unit of such power rating or lower can be used by the instant teaching as a decelerator. If the power rating is lower than approximately 250 pounds and low enough to give the desired degree of mild deceleration preferred herein, the described by-passes and bleeds can be obviated. Furthermore, the application of the foot brake pedal is additive and can give any further desired degree of braking even to a panic or skidding stop with the application of only light foot-brake-pedal pressure comparable to that required for vehicles equipped with "power brakes."

Meanwhile, however, as stated, such deceleration as is indicated in average driving and vehicle control is obtained without any resort to the brake pedal.

It is an object therefore, of this invention to provide new and improved means for achieving the above stated desired results and to provide therefore a new and approved universally adaptable reversible valve means suitable for most, if not all, current motor vehicle makes and models.

It is another specific object of the invention to provide a new and improved means for readily and selectively or automatically adjusting the desired degree of braking action of a form of automatic accelerator brake as shown or described in the co-pending application Serial No. 492,691.

Other and further objects of the invention will appear from the following description when considered in the light of the accompanying drawings and as more fully set forth or pointed out in the appended claims.

In the drawings;

Figure 1 is a schematic view in perspective of the mechanism of the invention as associated with other operative portions of the general form of braking system contemplated for use and association therewith; and Figure 2 is a longitudinal sectional view of the decelerating valve of Figure 1, embodying this invention.

Figure 3 is a sectional view as on the line 3—3 of Figure 2.

Figure 4 is a detail view of a by-pass valve arrangement embodying this invention.

Figure 5 is a drivers view of a dashboard or control panel as used in this invention.

Referring more particularly to the drawings, there is illustrated by way of illustration and not of limitation an automobile accelerating and brake control system.

A conventional master fluid cylinder 21 is secured to the vehicle in a conventional manner for operation as by the brake pedal 22 of a motor vehicle. Said master cylinder can be omitted if the motor vehicle's manually operated brake pedal is omitted so that the brakes are to be operated solely by the accelerator pedal linkage in accordance with the disclosure of said co-pending application. The master cylinder, however, where employed, is connected through a hydraulic line 23 to the inlet port 24 of a conventional power or booster unit 25. The power unit and master cylinder may comprise a single unit if desired and the separate master cylinder 21 eliminated.

The hydraulic outlet from the power unit is connected as by line 26 to the distribution box or other connection to each of the brake cylinders of the automobile in a conventional manner not shown.

The low pressure side of the power unit is connected by line 27 to the vacuum manifold of the internal combustion engine powering the vehicle. Said low pressure side of the booster is also connected as by line 28 to the low pressure port 29 of the control valve 30. The high pressure side of the power unit is connected as by line 31 to the high pressure port 32 of the control valve 30. The atmospheric port 33 of the control valve is optionally connected as by line 34 to an air cleaner 35 such as that customarily associated with the carburetor.

Said ports 29, 32, and 33 are threaded at 37, 38, and 39 respectively and are in communication with a longitudinal bore 40 in said body 36 which is controlled together with said ports 29, 32, and 33 by means of a valve element 42 having an annular undercut 43 which selectively closes the low pressure port 29 while opening the atmosphere port 33, or vice versa, depending upon the actuation of the accelerator pedal 44 mounted as on the floor board 45 of the motor vehicle. The ports 29 and 33 are advantageously slotted at 29¹ and 33¹ respectively to give an improved range of modulation. Said slots are preferably approximately 10 to 30 thousandths of an inch in width and from approximately ¼" to ½" long.

Said accelerator pedal operates through linkage 46 which is pivotally secured to the frame of the vehicle as by means of brackets 47, or the like. Said linkage 46 is pivotally secured at 48 to said valve element 42 and the valve body 36 is in turn pivotally secured as at 48 to another link 50 which, through its own horizontal pivotal connection with a bracket 51 operates the carburetor control arm 52, e. g., as in 1955 Lincolns.

The valve element 42 can be locked against relative movement within the valve body 36 as by means of an on-off push-pull linkage comprising a manually controllable knob 53 mounted on the dash panel and controllable through the driver's compartment. Said on-off feature may take the form of a Bowden cable 54, or the like, connected to a nut 56 at one end thereof, the nut abutting against a shoulder plate or stop 58 secured to the valve element 42.

A suitable spring 60 normally retains the carburetor arm, through the linkage 50 and 51, in a position of non-acceleration. Another suitable spring 59 normally retains the accelerator pedal 44 in a corresponding position of non-acceleration and also controls the valve element 42 so as to urge the same in a normal "brakes-on," or full deceleration position as will be described.

A by-pass port 65 (Figures 2 and 3) is provided between the low pressure port 37 and the high pressure port 38. This by-pass is preferably in the valve body 30, although it may also or additionally be located in any portion of the system so as to intercommunicate between the low pressure line 28 and the high pressure line 31, or between the low pressure and high pressure sides of the power or booster unit 25 and at 66. Said by-passes 65 and 66 are preferably provided with any adjustment screw or other suitable throttling valve members 67 and 68 respectively, by which the same may be opened or closed to any desired extent to regulate the amount of bleed between the low and high pressure lines 28 and 31 or between the high and low sides of the booster unit.

These by-passes 65 and 66 selectively, individually or collectively, cut down the pressure differential between the high and low pressure sides of the booster unit 25 to any desired extent and modulate the resultant braking action to give any desired degree of braking as well as to ease or prevent slamming when the brakes are applied to their fullest extent by maximum retraction of the accelerator pedal 44.

It has been found desirable to provide a predetermined amount of bleed at one or both of the by-passes 65 and 66 by virtue of their respective throttling elements, which can remain fixed for any given installation of the instant apparatus and which is controllable only by a mechanic or other operator, usually only under the hood of the automobile. Thus, the adjustment of the by-pass throttling means 67 and 68 can control and establish the maximum degree of brake application and modify the otherwise substantially unrestrained force of the pressure differential created between the high and low sides of the booster or power unit 25 when the valve 30 is in "full brake" position, i. e., fully open to atmosphere and otherwise fully closed between the low and high sides of the booster or its corresponding connecting lines 28 and 31.

Thus, the novice driving an automobile equipped with the instant unit for the first time, though he attempts to apply the brakes to their ultimate extent by a "panic" removal of his foot from the accelerator pedal will not cause the brakes to slam beyond the predetermined setting of said by-pass throttling means or either of them.

It has also been found advantageous to permit adjustment between maximum and minimum predetermined braking directly from the driver's compartment. Within the limits established through the by-passes 65 and/or 66 and/or optionally, when said by-passes are closed, through the full range of braking, a by-pass 75 is provided between the high and low pressure sides as between lines 31 and 28. Said by-pass 75 preferably incorporates a driver controlled valve 76 which is operable as by a stem 77 and control knob 78 from the driver's compartment. The stem 77 preferably extends through the fire wall 79 of the automobile through an aperture surrounded by a sound deadening insulator or grommet 80 so as to minimize any air noise or hissing in the by-pass valve 76 or its connecting lines.

The by-pass 75 can be used in addition to or in lieu of by-passes 65 and 66. If desired, the by-passes 65 and 66 can be fixedly adjusted under the hood of the vehicle as previously stated so as to establish a maximum degree of deceleration available to the driver from the driver's compartment, thus assuring non-slam braking.

It is particularly the uncontrolled slamming on of the brakes that has prevented the successful use and acceptance of braking systems of this general character intended in the prior art to be actuated by the accelerator pedal. Such slamming action is extremely dangerous to occupants of the vehicle as well as to others. Its prevention has never been so successfully achieved or the degree and final speed of deceleration so satisfactorily accomplished as by the instant invention. The attainment of this desired result is one of the major objects of this invention.

In furtherance of this objective the extent of driver control or rotation of the knob 78 to control the maximum degree of closure of the valve 76 is preferably limited, as accomplished by a stop or shoulder 80 thereon to prevent clockwise (per Figure 5) closing of the valve 76 beyond a predetermined amount established as by the shoulder 80 and (Fig. 4) a limiting stop 81 on the panel 82. At least a minimum by-pass through the valve 76 or by means of the by-pass 75 is thus assured at all times. The valve 76 may be, however, and preferably is, adjustable to a desired extent between the maximum closed position 84 thereof and the maximum desired open position 83 thereof corresponding respectively to a safe maximum and an acceptable minimum degree of deceleration or braking. A nicely cushioned deceleration, an optimum up and down hill hold, and anti-creep action are also beneficial concomitants of this arrangement and structure. Inasmuch as an increase flow of atmosphere into the intake manifold is introduced, particularly during deceleration, by the instant arrangement, as well as at other times, it has been found that a more perfect combustion of the fuel mixture to the motor is obtained, resulting in emission of fewer unburned hydro-carbons from the exhaust. Thus, the effect of the vehicle in producing undesirable smog is minimized.

By the above by-pass arrangements 65 and 76, either alone or in combination, even the sudden and complete removal of the foot of the operator from the accelerator pedal 44 will likewise result in a smooth, non-jarring stop. Said stop will be accomplished with a degree of deceleration depending upon the pressure differential between the high and low sides of the booster unit as modified by the setting of the by-pass valves. Between the "no-braking" position 85 and the maximum accelerator's braking position 86 any desired pre-set intermediate degree of braking may be achieved.

For the purpose of reducing the power of the unit 25, a controlled vent to atmosphere from the low pressure side is usable to advantage, as by the valve 75, which can also be connected directly into the vacuum line 27. (If desired, the vacuum line may be connected to the fuel pump vacuum source where available, instead of to the intake manifold.) Likewise, the high pressure side can be bled directly to the vacuum source in order to achieve a desired reduction of power in the unit 25.

The purpose of attaining a deceleration short of a braking type or a complete stop is achieved as above described when using currently available commercial power or booster units. Regulation of deceleration of the vehicle from a mild deceleration to a complete jarring or skidding stop is optionally achievable by the same power unit depending on regulation of the by-pass and/or the atmospheric or vacuum bleeds. Preferably, however, as stated, the power unit should have a maximum decelerating capacity significantly less than needed to accomplish full braking or it should be modified by the herein disclosed bleeds or by-passes or both to render the same "underpowered."

Further, said unit provides an up and down hill hold on an incline up to about a 30% grade when the vehicle has been stopped.

Further, said unit provides an "anti-creep" control of those vehicles having torque "fluid" drive and/or other types of automatic transmissions. Once the vehicle is stopped the automatic decelerator holds the vehicle in its stationary position.

The operation of the above described system is as follows:

Normal acceleration and control of the carburation for the vehicle is accomplished in the customary manner as by means of the foot pedal 44 in its normal acceleration and deceleration range as defined by the solid line position thereof in Figure 1 of the drawings and the dotted outline position 85 thereof in said figure. The customary linkage 46, 50, and 52 may be employed for this purpose and a valve 30 or other lost motion connection inserted and comprising a portion of the total carburetor-to-accelerator pedal linkage provides free non-accelerating play in such linkage permitting additional travel between the dotted line positions 85 and 86 of the accelerator pedal as illustrated in Figure 1.

When the accelerator pedal is in the solid line position 44 the free play or lost motion valve 30 has been taken up and the carburetor admits a full supply of gasoline to the motor. At approximately the position 85 of the accelerator pedal a neutral position is reached so that if the pedal 44 is moved back further toward the position 86 the lost motion linkage or valve 30 is actuated to move the valve element 42 downwardly relative to the valve body 36 also preferably comprising a portion of such lost motion connection in a manner to close the vacuum port 29, $29^1$ to any desired degree while opening the atmosphere port 33, $33^1$. This action brings atmosphere from the air cleaner 35 to the relatively high pressure side of the power unit 25 through the hose 34 the high pressure port 32 and the hose 31. Inasmuch as closure of the vacuum or low pressure port $29^1$, 29 seals off to the extent desired any leak from the high pressure port 32, the high pressure side of the power unit 25 is normally under full vacuum except as the same may be softened or the pressure increased therein by either or all of the by-passes 65, 75, or 66 or by the optional direct air bleed heretofore mentioned. Similarly, atmosphere is introduced at the rate and extent desired by means of the atmosphere port 33, $33^1$ except to the extent that such pressure is reduced by means of either of said by-passes or said direct bleed to vacuum heretofore mentioned.

Preferably, as also heretofore noted, it is desirable to utilize a so-called underpowered power unit whose maximum capacity to apply effective braking pressure to the brakes is only such as will achieve no more than the desired maximum degree of deceleration contemplated by this invention.

Following full opening to any pre-set extent of the atmospheric port 33, $33^1$ and/or the closing to any predetermined and pre-set extent of the vacuum port 29, $29^1$ the vehicle will decelerate at the pre-set rate. Any further deceleration such as is desired to bring the vehicle to a full stop or to achieve increased deceleration is accomplished by application of the conventional foot brake by means of the pedal 22 which thereby serves to boost the effective braking pressure over and above that achieved by the accelerator operated system heretofore described.

The release of the brakes or the cessation of deceleration is accomplished by reverse movement of the pedal 44 and the linkages 46, 50, 52 and the valve element 42 in the valve body 36, that is to say, upon movement of the accelerator pedal 44 from a position 86 towards the position 85 or even to the solid line position of the pedal in Figure 1 the valve element 42 is moved upwardly in the body 36. The atmosphere port 33, $33^1$ is thereby closed reducing or depriving the high pressure side of the power unit 25 of atmospheric pressure while opening the port 29, 29¹ so as to evacuate said high side of the booster and relieve the brakes.

In order to more accurately define such terms as "deceleration" as opposed to "braking" "panic stop" "sliding stop" and the like, and to indicate the maximum degree of deceleration contemplated by the instant invention, as well as to define the power limit for the power unit and the nature of the "underpowering" required of it, there is set forth hereinafter a definitive table. This table shows the maximum limits of deceleration contemplated by this invention. The equipment and devices herein described must be pre-set outside of the immediately useful control of the driver in making the particular deceleration in question and solely through operation of the accelerator pedal 44.

The above principles and structures may be modified within the skill of those familiar with this art for either air suspended or vacuum suspended booster units.

*Table*

| Vehicle Speed | Panic Stopping Distance | Decelerating Stopping Distance |
|---|---|---|
| 20 M. P. H. | approximately 18 ft. | approx. 28 ft. or more. |
| 40 M. P. H. | 84 ft. | 127 ft. |
| 60 M. P. H. | 197 ft. | 300 ft. |
| 80 M. P. H. | 350 ft. | 535 ft. |

The above stopping distances are on dry concrete or dry bituminous pavement but are also satisfactory on such wet pavement. Stopping distances on dry ice or packed snow are approximately twice the decelerating stop distances for the corresponding speeds. Stopping on wet ice takes longer, but in each condition the instant apparatus can be pre-set or pre-determined to achieve a corresponding satisfactory decelerating stop. The decelerator is pre-set as to load, tire and road conditions, and other variables.

Having thus described my invention, what I claim as new and desire to secure by Letters Patent is:

1. In an accelerator actuatable fluid decelerating system of the character described, a power booster unit arranged to actuate vehicle brakes having a high pressure side and a low pressure side, a valve for selectively introducing atmospheric and vacuum pressure to said booster unit, means connecting said valve with said booster unit for said selective introduction of atmospheric and vacuum pressure to the respective high pressure and low pressure sides thereof, whereby any selected degree of pressure difference between said sides can be introduced, accelerator control means for said valve, and by-pass means between the high and low pressure sides of said system arranged to limit the pressure differential between said sides to such maximum value that said unit is incapable of bringing said vehicle to a sudden stop.

2. In a decelerating system as defined in claim 1, said by-pass means including adjustable throttling means.

3. In a decelerating system as defined in claim 1 including adjustable throttling means.

3. In a decelerating system as defined in claim 1 including valve means for controlling an air flow therethrough, and means for operating said valve means from the driver's compartment of the motor vehicle.

4. In a decelerating system as defined in claim 3, said means for operating said valve means including adjustable limiting means for establishing a maximum opening of said valve means less than the fully open position of said valve means, respectively.

5. In a decelerating system as defined in claim 3, said means for operating said valve means including adjustable limiting means for establishing a maximum and minimum opening of said valve means less than the fully open and fully closed positions of said valve means, respectively.

References Cited in the file of this patent

UNITED STATES PATENTS

| | | |
|---|---|---|
| 1,665,306 | Kennington | Apr. 10, 1928 |
| 2,087,305 | Schmitt et al. | July 20, 1937 |
| 2,177,471 | Baade | Oct. 24, 1939 |
| 2,325,771 | Humphill | Sept. 3, 1943 |
| 2,610,716 | Adams et al. | Sept. 16, 1952 |
| 2,626,026 | Sherwood et al. | Jan. 20, 1953 |
| 2,643,746 | Righter | June 30, 1953 |